(12) United States Patent
Kuehnel

(10) Patent No.: US 8,781,494 B2
(45) Date of Patent: Jul. 15, 2014

(54) CROWD SOURCING WITH ROBUST DEVICE POSITION DETERMINATION

(75) Inventor: Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 13/428,805

(22) Filed: Mar. 23, 2012

(65) Prior Publication Data

US 2013/0252628 A1   Sep. 26, 2013

(51) Int. Cl.
*H04W 24/00* (2009.01)
*H04W 64/00* (2009.01)
*H04W 4/04* (2009.01)
*H04W 4/02* (2009.01)
*H04L 29/08* (2006.01)

(52) U.S. Cl.
CPC ............. *H04W 64/00* (2013.01); *H04W 4/04* (2013.01); *H04W 4/025* (2013.01); *H04W 4/026* (2013.01); *H04W 4/027* (2013.01); *H04W 1/028* (2013.01); *H04L 29/08657* (2013.01)
USPC ................. 455/456.1; 455/456.2; 455/456.3; 455/456.4; 455/456.5; 455/456.6

(58) Field of Classification Search
CPC ....... H04W 64/00; H04W 4/02; H04W 4/025; H04W 4/026; H04W 4/027; H04W 4/028; H04L 29/08657
USPC .......... 455/456.1, 456.2, 456.3, 456.4, 456.5, 455/456.6, 457
See application file for complete search history.

(56) References Cited

U.S. PATENT DOCUMENTS

| 5,923,286 | A | 7/1999 | Divakaruni | |
|---|---|---|---|---|
| 6,052,598 | A * | 4/2000 | Rudrapatna et al. | 455/456.1 |
| 6,424,916 | B2 | 7/2002 | Nysen | |
| 6,526,283 | B1 * | 2/2003 | Jang | 455/456.5 |
| 6,665,540 | B2 * | 12/2003 | Rantalainen et al. | 455/456.5 |
| 7,248,883 | B2 * | 7/2007 | Cuffaro | 455/456.1 |
| 8,086,248 | B2 * | 12/2011 | Coronel et al. | 455/456.1 |
| 2009/0262974 | A1 | 10/2009 | Lithopoulos | |

OTHER PUBLICATIONS

Roth, et al., "Application of robust, high-accuracy positioning for autonomous ground vehicles", Retrieved at <<http://www.ri.cmu.edu/pub_files/pub4/roth_stephan_a_2004_1/roth_stephan_a_2004_1.pdf>>, AUVSI Unmanned Systems North America, Aug. 2004, pp. 12.

(Continued)

*Primary Examiner* — Olumide T Ajibade Akonai
(74) *Attorney, Agent, or Firm* — John Jardine; Andrew Sanders; Micky Minhas

(57) ABSTRACT

A device records observation data including positions of the device. The position of the device can be determined based on a difference between the timing of receipt, from a wireless source, of repetitive data at a trusted position and the timing of receipt of the repetitive data at a new position. The difference is used to determine a distance the new position is away from the wireless source relative to the trusted position, and this distance is used to determine an identification of the new position. The position of the device can also be determined by recording inertial data even though no position of the device is known. When a trusted position of the device is subsequently identified, the inertial data is used to backtrack along a path that the device moved to identify trusted positions of the device along the path.

20 Claims, 10 Drawing Sheets

(56) References Cited

OTHER PUBLICATIONS

Berman, et al., "The Role of Dead Reckoning and Inertial Sensors in Future General Aviation Navigation", Retrieved at <<http://ieeexplore.ieee.org/stamp/stamp.jsp?tp=&arnumber=670206>>, Position Location and Navigation Symposium, IEEE Apr. 23, 1998, pp. 510-517.

Ledlie, et al., "Molé: a Scalable, User-GeneratedWiFi Positioning Engine", Retrieved at <<http://people.csail.mit.edu/jgpark/docs/LPC11.pdf>>, International Conference on Indoor Positioning and Indoor Navigation (IPIN), Nov. 4, 2011, vol. 21-23, pp. 10.

"Using Inertial Sensors to Improve GPS Performance", Retrieved at <<http://www.spirent.com/Blog/Positioning/2011-04-27_Inertial_Sensors.aspx>>, Apr. 27, 2011, p. 1.

Urban, et al., "Map-Aided Positioning System", Retrieved at <<http://www.control.isy.liu.se/~fredrik/reports/02fisita.pdf>>, Jun. 2002, pp. 11.

* cited by examiner

900

902 — Record, Without Knowing A Trusted Location Of The Device, Both Inertial Data Identifying Movement Of The Device And Signals Detected By The Device 904 — Identify, After Beginning Recording Of The Inertial Data And Signals Detected By The Device, A Trusted Position Of The Device 906 — Determine, Based On The Trusted Position, Positions Of The Device Based On The Inertial Data

Fig. 9

CROWD SOURCING WITH ROBUST DEVICE POSITION DETERMINATION

BACKGROUND

As cellular phones have become more commonplace and powerful, the desire for certain applications to provide location-based functionality on these phones has increased. In order to provide such location-based functionality, the position of the phone needs to be known. The position of a phone can sometimes be determined based on coordinates received from a global positioning system (GPS) of the phone. However, it remains difficult to determine the position of a phone under certain circumstances, such as when the GPS receiver of the phone is not able to determine an accurate position of the phone, or when the phone does not include GPS functionality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, at a device a trusted position of the device is identified. Repetitive data from a wireless source is received, and a first timing of receipt of the repetitive data at the trusted position is determined. After the device has moved from the trusted position to a new position, a second timing of receipt of the repetitive data at the new position is determined. Based on both the first timing and the second timing, a distance away from the wireless source that the new position is relative to the trusted position is determined. Based on the distance away from the wireless source that the new position is relative to the trusted position, an identification of the new position is determined, and observation data associating the new position with signals detected by the device at the new position is recorded.

In accordance with one or more aspects, both inertial data identifying movement of a device and signals detected by the device are recorded at the device without knowing a trusted position of the device. After beginning recording of the inertial data, a trusted position of the device is identified. Based on the trusted position of the device and the recorded inertial data, particular positions of the device associated with particular signals detected by the device are determined.

BRIEF DESCRIPTION OF THE DRAWINGS

The same numbers are used throughout the drawings to reference like features.

FIG. 9 is a flowchart illustrating another example process for implementing the crowd sourcing with robust device position determination in accordance with one or more embodiments.

DETAILED DESCRIPTION

Crowd sourcing with robust device position determination is discussed herein. A device records observation data including positions of the device associated with signals detected by the device at those positions. The signals can be received from various wireless sources. The position of the device can be determined in various manners, providing robust position determination in situations in which a Global Navigation Satellite System (GNSS) or other identifier of a trusted position of the device is not available or used.

The position of the device can be determined based on a timing of receipt, at the device, of repetitive data from a wireless source. A difference between the timing of receipt of the repetitive data at a trusted position and the timing of receipt of the repetitive data at a new position can be used to determine a distance the new position is away from the wireless source relative to the trusted position, and this distance can be used to determine an identification of (e.g., coordinates of) the new position. The position of the device can also be determined based on a subsequently identified trusted position. Inertial data can be recorded even though no position of the device is known. When a trusted position of the device is subsequently identified, the inertial data can be used to backtrack along a path that the device moved to identify trusted positions of the device along the path.

Inertial data is obtained from one or more inertial sensors that detect movement (e.g., rotation, motion, velocity, etc.), position, and/or direction. Inertial data can be used to determine a relative position from a trusted position, but inertial sensors oftentimes suffer from drift, which is error that accumulates over time and/or movement. The techniques discussed herein allow for robust device position determination that can reduce or alleviate reliance on inertial data, and/or that can compensate for some of this drift and thus improve the reliability of inertial data.

Figure 1:
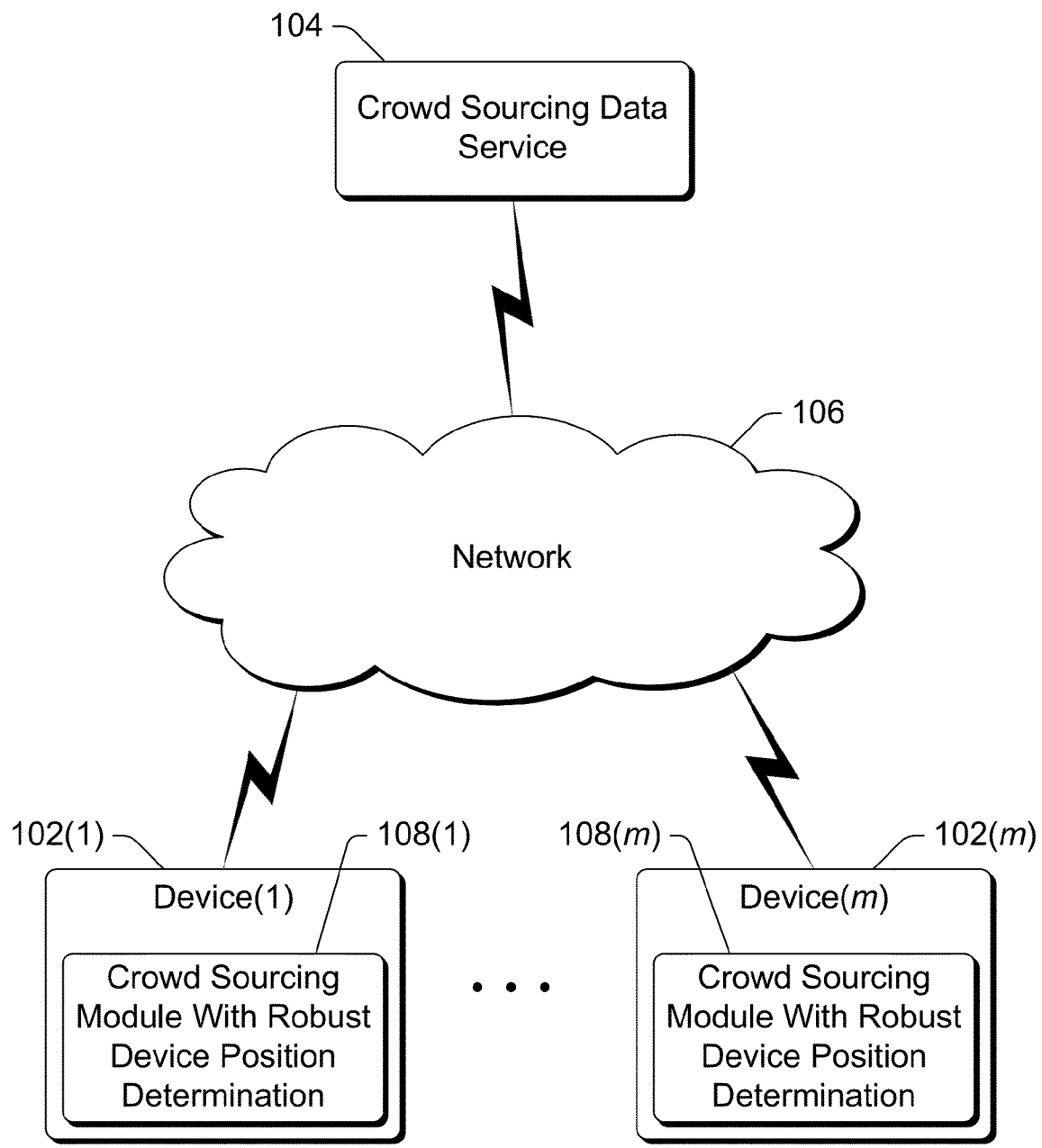
FIG. 1 illustrates an example system implementing the crowd sourcing with robust device position determination in accordance with one or more embodiments.

FIG. 1 illustrates an example system 100 implementing the crowd sourcing with robust device position determination in accordance with one or more embodiments. System 100 includes one or more (m) devices 102 that can communicate with a crowd sourcing data service 104 via a network 106. Network 106 can be a variety of different networks, including the Internet, a local area network (LAN), a wide area network (WAN), a telephone network, an intranet, other public and/or proprietary networks, combinations thereof, and so forth.

Each device 102 can be a variety of different types of devices, with different devices 102 being the same and/or different types of devices. A device 102 is typically a mobile device, the position of which is expected to change frequently over time. For example, a device 102 can be a cellular or other wireless phone, a laptop or netbook computer, a tablet or notepad computer, a mobile station, an entertainment appliance, a game console, an automotive computer, and so forth. Thus, devices 102 may range from full resource devices with substantial memory and processor resources (e.g., laptop computers, tablet computers) to low-resource devices with limited memory and/or processing resources (e.g., entertainment appliances, hand-held game consoles).

A device 102 records data identifying signals that the device 102 receives as well as data indicating a corresponding position of the device 102 at various points in time, as discussed in more detail below. A device 102 can also optionally provide various other functionality in addition to recording the data identifying received signals and corresponding device position at various points in time, such as phone or other communication functionality, automotive computer functionality, gaming functionality, and so forth. Alternatively, a device 102 can be a dedicated position sensing device that supports little, if any, functionality other than recording the data identifying received signals and corresponding device position at various points in time.

Each device 102 includes a crowd sourcing module 108 that supports robust device position determination. Although illustrated as a single module, it should be noted that the functionality of module 108 can alternatively be separated into multiple modules. Each crowd sourcing module 108 can record observation data including data identifying signals that device 102 receives at various points in time. Crowd sourcing module 108 can determine a location of the device 102 at a particular point in time in various manners, including based on timing of receipt of repetitive data and/or backtracking after a trusted position is identified, as discussed in more detail below.

Data indicating the position of the device 102, as well as data identifying signals received by the device 102 (and optionally strengths and/or timings of those signals) at that indicated position, at various times is recorded by device 102. This recorded data is also referred to as crowd sourcing data, and is provided to crowd sourcing data service 104. Crowd sourcing as used herein refers to each of multiple (typically a large number, such as many thousands of or more) devices providing data to a service, so the service obtains data from a crowd of devices rather than relying on data from a single device. Both the individual devices and the service play a part in the crowd sourcing.

Crowd sourcing data service 104 receives recorded data from multiple devices 102, collecting the data for subsequent use. The data collected by crowd sourcing data service 104 can be used to provide various location-based or position-based functionalities. As used herein, a location refers to a general or larger geographic area rather than a precise coordinate, such as one or more buildings (e.g., home or work), a business or store, and so forth. A position, however, refers to a geographic area that is more precise than a location, such as a coordinate in some coordinate system (e.g., a particular latitude and/or longitude), a particular elevation (e.g., altitude), and so forth. Thus, each location can include multiple positions. Crowd sourcing data service 104 is implemented using one or more devices. The one or more devices used to implement crowd sourcing data service 104 can be a variety of different types of devices, such as server computers, desktop computers, any of the various types of devices discussed above with reference to devices 102, and so forth. Service 104 can be implemented using multiple ones of the same and/or different types of devices.

In one or more embodiments, the recording of data indicating the position of a device and/or the providing of the recorded data to crowd sourcing data service 104 is performed only after receiving user consent to do so. This user consent can be an opt-in consent, where the user takes an affirmative action to request that the position data be recorded and/or provided before crowd sourcing module 108 performs any recording of data for the device and/or providing of data to crowd sourcing data service 104. Alternatively, this user consent can be an opt-out consent, where the user takes an affirmative action to request that the position data not be recorded and/or provided; if the user does not choose to opt out of this recording and/or providing of the position data, then it is an implied consent by the user to record the position data and provide the data to crowd sourcing data service 104.

Furthermore, it should be noted that the techniques discussed herein can allow devices 102 to provide position data to crowd sourcing data service 104, but need not include any personal information identifying particular users of devices 102 and/or particular devices 102. For example, a device 102 can record position data and provide the position data to service 104, but no association between the device 102 and the position data need be provided to and/or maintained by service 104. Similarly, no association between the user of the device 102 and the position data need be provided to and/or maintained by service 104.

Figure 2:
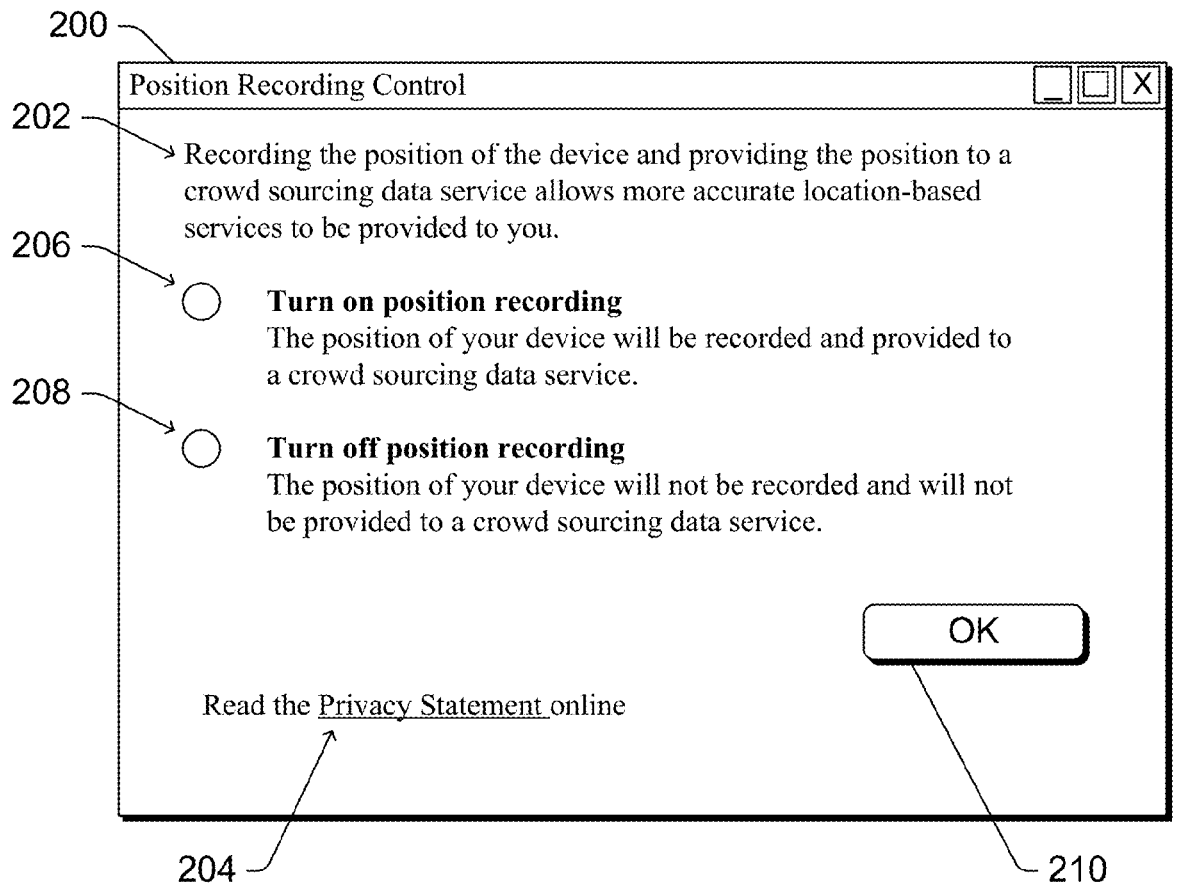
FIG. 2 illustrates an example user interface that can be displayed to a user of a device to allow the user to select whether position data for that device will be recorded and provided to a crowd sourcing data service in accordance with one or more embodiments.

FIG. 2 illustrates an example user interface that can be displayed to a user of a device to allow the user to select whether position data for that device will be recorded and provided to a crowd sourcing data service in accordance with one or more embodiments. A position recording control window 200 is displayed including a description 202 explaining to the user why the position of the device is being recorded. A link 204 to a privacy statement is also displayed. If the user selects link 204, a privacy statement is displayed, explaining to the user how the recorded position data is kept confidential and/or how no association between the position and the device (as well as the user of the device) is maintained.

Additionally, the user is able to select a radio button 206 to opt-in to the position recording and providing, or a radio button 208 to opt-out of the position recording and providing. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the position recording and providing, and that a variety of other conventional user interface techniques can alternatively be used. The device then proceeds to record the device position and provide the device position to a crowd sourcing data service, or neither record the device position nor provide the device position to a crowd sourcing data service, in accordance with the user's selection.

Figure 3:
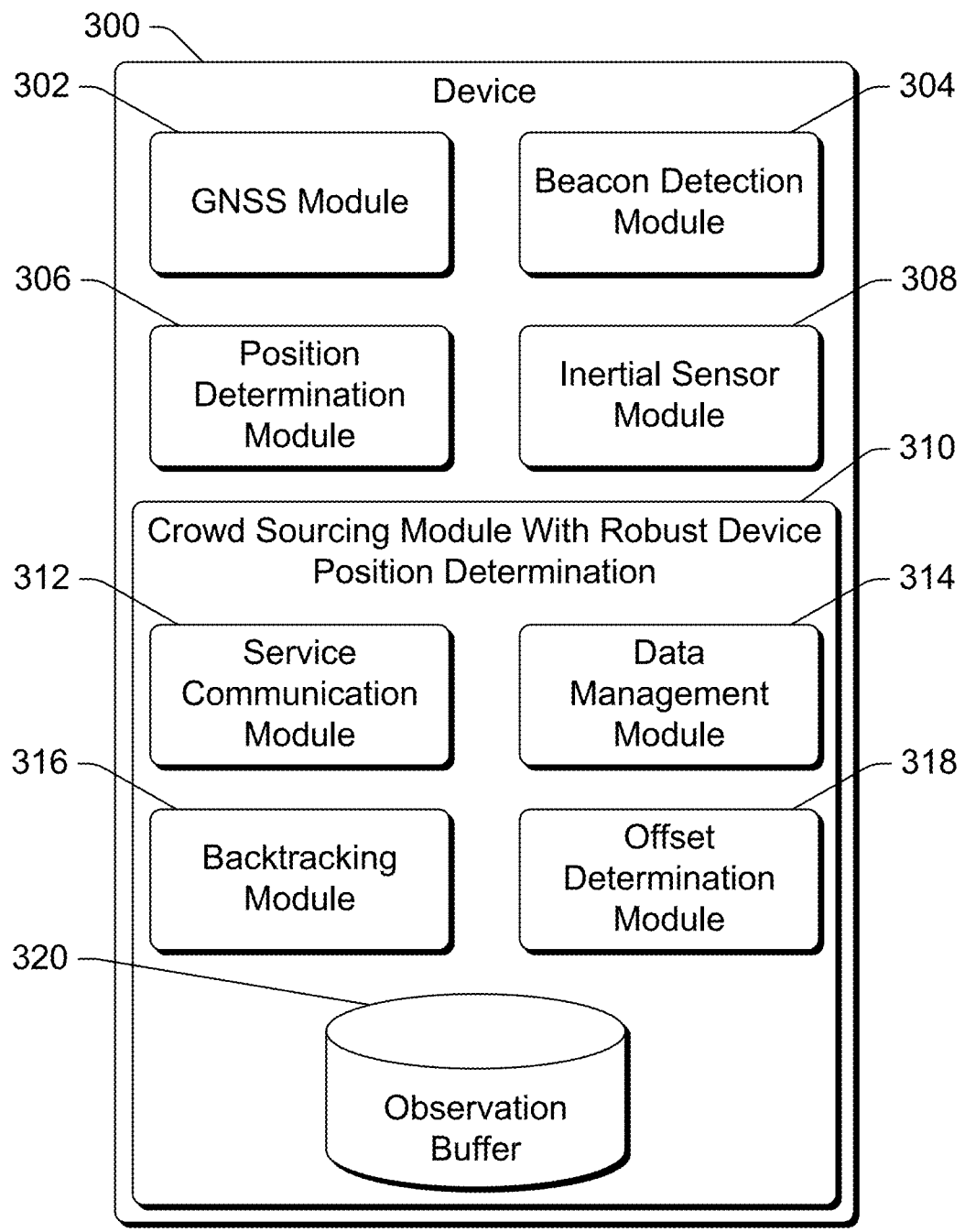
FIG. 3 illustrates an example device implementing the crowd sourcing with robust device position determination in accordance with one or more embodiments.

FIG. 3 illustrates an example device 300 implementing the crowd sourcing with robust device position determination in accordance with one or more embodiments. Device 300 can be, for example, a device 102 of FIG. 1. Device 300 includes a Global Navigation Satellite System (GNSS) module 302, a beacon detection module 304, a position determination module 306, an inertial sensor module 308, and a crowd sourcing module 310 that supports robust device position determination. Crowd sourcing module 310 can be, for example, a crowd sourcing module 108 of FIG. 1. Crowd sourcing module 310 includes a service communication module 312, a data management module 314, a backtracking module 316, an offset determination module 318, and an observation buffer 320. Although modules 302-308 are illustrated as separate from crowd sourcing module 310, at least part of module 302, 304, 306, and/or 308 can be included as part of crowd sourcing module 310. Each module 302-318 can be implemented in software, firmware, hardware, or combinations thereof. Although specific modules are illustrated in FIG. 3, it should be noted that additional modules can be included in device 300. Additionally, it should be noted that the functionality of multiple modules illustrated in FIG. 3 can be combined into a single module, and/or the functionality of one or more modules illustrated in FIG. 3 can be separated into multiple modules.

GNSS module 302 implements GNSS functionality for device 300, determining a position of device 300 based on one or more satellites from which GNSS module 302 can receive signals or otherwise communicate. This determined position is typically latitude and longitude coordinates (and optionally altitude), although the position can alternatively be specified in other manners. GNSS module 302 can implement the GNSS functionality using a variety of different technologies, such as the Global Positioning System (GPS), the Global Navigation Satellite System (GLONASS), the BeiDou (or Compass) navigation system, the Galileo positioning system, combinations thereof, and so forth.

GNSS module 302 provides or otherwise makes available the determined position of device 300 to various other modules of device 300. GNSS module 302 can also provide or otherwise make available an indication of the strength of signals received by module 302 from satellites.

GNSS module 302 can determine the position of device 300 at regular or irregular intervals. GNSS module 302 can also determine the position of device 300 in response to various events, such as a request from another module of device 300.

Beacon detection module 304 detects wireless signals (also referred to herein as simply signals), and optionally various characteristics of those wireless signals received at device 300. Various characteristics of the wireless signals can be detected, such as the strength, timing, and/or correlation of the wireless signals received at device 300. The source of (e.g., transmitter of) the wireless signals is also referred to herein as a wireless beacon (or simply a beacon). Beacon detection module 304 can detect wireless signals, and optionally the various characteristics of the wireless signals, at regular or irregular intervals. Beacon detection module 304 can also detect wireless signals, and optionally the various characteristics of the wireless signals, in response to various events, such as a request from another module of device 300.

One or more of various different types of wireless signals can be detected by beacon detection module 304. In one or more embodiments, the type of wireless signals detected by beacon detection module 304 are Wi-Fi signals. Beacon detection module 304 can receive signals from various wireless access points, including an identifier of a particular wireless access point and/or a particular wireless network from which a signal is received. For example, a wireless access point may send a media access control (MAC) address of the wireless access point, which is equivalent to the basic service set identifier (BSSID) of the wireless network created by the wireless access point, and so forth. Beacon detection module 304 can also measure a strength (e.g., received signal strength indicator (RSSI) values) of these received radio signals, the timing of the signals with respect to a reference time and frequency, and/or the relationship to other signals received from other sources such as other Wi-Fi access points. It should be noted that module 304 can, at any given time for any given position of device 300, receive signals from multiple wireless access points. Beacon detection module 304 provides or otherwise makes available an indication of the identifiers of the detected signals (the particular wireless access points and/or wireless networks from which signals are received), as well as the various characteristics of those signals, to various other modules of device 300.

Another type of wireless signals that can be detected by beacon detection module 304 are cellular signals. Beacon detection module 304 can receive signals from various cell transceivers (e.g., cell towers), including an identifier of a particular cell transceiver (e.g., a cell tower or transceiver identifier) from which a signal is received. Beacon detection module 304 can also measure various characteristics of these received signals, such as strength (e.g., RSSI values), timing, frequency, and/or correlation of these received signals. It should be noted that module 304 can, at any given time for any given position of device 300, receive signals from multiple cell transceivers. Beacon detection module 304 provides or otherwise makes available an indication of the identifiers of the detected signals (the particular cell transceivers from which signals are received), as well as the various characteristics of those signals, to various other modules of device 300

Beacon detection module 304 can also detect various other types of wireless signals, and can also measure various characteristics of these various other types of wireless signals, such as a strength (e.g., RSSI values), timing frequency, and/or correlation of these various other types of wireless signals. For example, beacon detection module 304 can detect television signals from various television transmitters at various frequencies, including an identifier (e.g., call sign or call letters) of a station or other entity transmitting on each of various frequencies. By way of another example, beacon detection module 304 can detect AM radio signals from various radio transmitters at various frequencies, including an identifier (e.g., call sign or call letters) of a station or other entity transmitting on each of various frequencies. By way of yet another example, beacon detection module 304 can detect FM radio signals from various radio transmitters at various frequencies, including an identifier (e.g., call sign or call letters) of a station or other entity transmitting on each of various frequencies. By way of yet another example, beacon detection module 304 can detect wireless signals from Bluetooth transmitters, Bluetooth Low Energy (BLE) transmitters, Near Field Communication (NFC) transmitters, and so forth. In another embodiment the beacon detection module may detect non electromagnetic signals, such as audio waves, ultrasound, light, and so forth.

Beacon detection module 304 provides data identifying the signals detected by module 304 to crowd sourcing module 310. Crowd sourcing module 310 associates the data received from module 304 identifying signals detected at particular positions with those positions, and provides the data and associated positions to a crowd sourcing data service (such as service 104 of FIG. 1) as discussed in more detail below. The data identifying the signals detected by module 304 include an identification of the detected signals (e.g., an identifier of a wireless access point, an identifier of a wireless network, an identifier of a cell transceiver, an identifier of a station or other entity transmitting on a particular frequency, etc.) and optionally various characteristics of the detected signals. The identification of the detected signals (and optionally also one or more characteristics of the detected signals) is also referred to as a fingerprint of the detected signals.

In one or more embodiments, identifying of a trusted position by device 300 is an event in response to which beacon detection module 304 detects one or more signals. Thus, each time a trusted position is identified by device 300, beacon detection module 304 also detects one or more wireless signals. A trusted position refers to a position that is deemed by device 300 to be a reliable identification of the position of device 300, and can be determined in different manners. In one or more embodiments, the trusted position is a position identified by GNSS module 302. In other embodiments, the trusted position is a position identified by a wireless signal received from a wireless transmitter, such as from a Bluetooth transmitter, a BLE transmitter, a radio frequency transmitter, an NFC transmitter, and so forth. Each such transmitter can transmit a signal that is detected by device 300 (e.g., beacon detection module 304) and can include an indication of the position of the wireless beacon. The position of the wireless beacon can be transmitted in different manners, such as being transmitted as latitude and longitude coordinates, being transmitted as an identifier that can be looked up in a table included as part of or otherwise accessible to device 300 to determine a corresponding position of the wireless beacon, and so forth.

Crowd sourcing module 310 associates the trusted position with the data identifying the signals detected by module 304, and provides the trusted position and data identifying the signals detected by module 304 to a crowd sourcing data service (such as service 104 of FIG. 1) as discussed in more detail below. The signals detected by module 304 (and optionally various characteristics of the signals) and the associated trusted position at a particular time are also referred to as an observation. The data identifying the signals detected by module 304 (and optionally various characteristics of the signals) and the data identifying the associated trusted position at a particular time are also referred to as the observation data at that particular time. The crowd sourcing data service can use the observation data in various manners, such as to subsequently identify positions of a device (device 300 or other devices) in response to a request from the device. For example, a device can provide to the crowd sourcing data service data identifying signals detected by the device at a particular time, and the crowd sourcing data service can readily identify a trusted position of the device based on both the signals detected by the device and the observation data received from multiple devices.

In addition to, or alternatively in place of, beacon detection module 304 detecting one or more wireless signals each time a trusted position is identified by device 300, one or more wireless signals can be detected and/or a trusted position identified at other times. For example, one or more wireless signals can be detected and a trusted position identified in response to a change in one or more wireless signals detected by module 304 (e.g., a change in the sources of the wireless signals, a change in one or more characteristics of the wireless signals, etc.). By way of another example, one or more wireless signals can be detected and a trusted position identified in response to a particular amount of time elapsing since one or more wireless signals were last detected and/or a trusted position last identified. The one or more wireless signals can alternatively be detected and/or a trusted position alternatively identified in response to various other events (e.g., a sensor detecting that device 300 has moved at least a threshold distance, a change in power state of device 300, and so forth).

Inertial sensor module 308 includes one or more inertial sensors that detect movement (e.g., rotation, motion, velocity, etc.), position, and/or direction. These inertial sensors can be MEMS (Microelectromechanical Systems or Microelectronicmechanical systems). These inertial sensors can include, for example, an accelerometer, a compass, a gyroscope, a barometric altimeter, and so forth. Inertial sensor module 308 collects data regarding the detected movement, position, and/or direction of device 300 from these inertial sensors, and provides or otherwise makes available this collected data to other modules of device 300. This data can be used to determine a position of device 300 based on backtracking and/or repetitive data, as discussed in more detail below.

It should also be noted that although inertial sensor module 308 is illustrated as being part of device 300, one or more inertial sensors can be implemented as a separate component or device that is coupled to device 300. For example, inertial sensors can be implemented as part of a watch worn by a user, as part of a device attached to (or part of) a user's shoe or other clothing, as part of a heart rate monitor component, and so forth.

Inertial sensor module 308 can collect data at regular or irregular intervals. Inertial sensor module 308 can also collect data in response to various events, such as a request from another module of device 300. In one or more embodiments, inertial sensor module 308 (including the inertial sensors) can also be deactivated or powered down at various times (e.g., to conserve energy), and not provide or collect data until module 308 is activated or powered on. Inertial sensor module 308 can be configured to deactivate or power down itself in response to certain conditions (e.g., after a threshold amount of time), and/or in response to a deactivate or power down signal from another module of device 300. Inertial sensor module 308 (including the inertial sensors) can be activated or powered on in response to a signal from another module of device 300 and/or in response to certain conditions (e.g., being deactivated or powered down for a threshold amount of time).

Data management module 314 receives the data identifying the signals detected by module 304 at a particular time as well as an identification of a trusted position at that particular time. The trusted position can be identified by, for example, GNSS module 302 or beacon detection module 304, or backtracking module 316 or offset determination module 318 as discussed below. Data detected and a trusted position identified are treated as being at the same particular time if they are detected/determined at identical times or within a threshold amount of time of one another (e.g., within 3 seconds). Data management module 314 stores a record of observation data at a particular time in observation buffer 320, the observation data at that particular time including both the data identifying the signals detected by module 304 (and optionally various characteristics of the signals) at that particular time and data identifying the identified trusted position at that particular time. The data identifying the signals detected by module 304 (and optionally various characteristics of the signals) at that particular time and the identified trusted position at that particular time are thus associated with one another. In one or more embodiments, data management module 314 also stores as part of the observation data a timestamp of the particular time. The timestamp can be different times, such as the date and time the data identifying the signals was detected by beacon detection module 304 or the time the trusted position was identified, the data and time the data identifying the signals detected by module 304 or the data identifying the trusted position is received or obtained by data management module 314, and so forth.

Service communication module 312 manages communication with and data transfer between device 300 and a crowd sourcing data service (e.g., service 104 of FIG. 1). Service communication module 312 provides observation data from observation buffer 320 to the crowd sourcing data service. In one or more embodiments, module 312 provides observation data to the crowd sourcing data service in a secure manner so that other devices or other entities cannot view the observation data. Service communication module 312 can provide the observation data in a secure manner using any of a variety of techniques, such as establishing a secure communication channel between device 300 and the crowd sourcing data service (e.g., using a Transport Layer Security (TLS) or Secure Sockets Layer (SSL) channel) via which the observation data is communicated, by encrypting the observation data with a public key of a public/private key pair of the crowd sourcing data service, and so forth.

Service communication module 312 applies one or more of various criteria in determining when the observation data is to be provided to the crowd sourcing data service. In response to one or more of the criteria being satisfied, which is also referred to herein as a particular event occurring, service communication module 312 transmits the observation data in observation buffer 320 to the crowd sourcing data service. Module 312 typically transmits all of the observation data in buffer 320 to the crowd sourcing data service, although alternatively module 312 can transmit less than all of the observation data in buffer 320.

The event occurring can be, for example, device 300 otherwise accessing the crowd sourcing data service (accessing the crowd sourcing data service for some purpose other than to transmit observation data to the crowd sourcing data service). By way of another example, the event occurring can be device 300 being connected to a particular type of network (e.g., a Wi-Fi network). By way of yet another example, the event occurring can be a threshold amount of observation data being stored in observation buffer 320). By way of still another example, the event occurring can be device 300 being powered by a particular type of power (e.g., by AC power rather than battery power).

Thus, observation buffer 320 is a temporary store of observation data. Data management module 314 stores observation data in buffer 320, and service communication module 312 retrieves observation data from buffer 320 for transmission to a crowd sourcing data service. Observation data can be deleted from observation buffer 320 after being transmitted to the crowd sourcing data service, or alternatively need not be deleted until a later time. For example, observation data may not be deleted from observation buffer 320 until buffer 320 is filled with data, at which point observation data is deleted from buffer 320 in a first in, first out manner.

Offset determination module 318 determines a position of device 300 at a particular point in time based on a timing of receipt of repetitive data at device 300. Offset determination module 318 can be used to determine a position of device 300 at various times, such as situations in which GNSS module 302 (or a position identified in a signal received by beacon detection module 304) is not available or used. Some wireless sources transmit repetitive data at regular intervals (e.g., every 10 milliseconds (ms), every 20 ms, every 100 ms, etc.). The interval at which a particular signal source transmits repetitive data can vary based on the particular type of wireless signal and/or the particular wireless source. The repetitive data can be detected by, for example, beacon detection module 304.

The intervals at which a particular wireless source transmits the repetitive data can be determined in different manners. In one or more embodiments, beacon detection module 304 analyzes received wireless signals from various wireless sources and automatically detects repetitive data within those wireless signals. Repetitive data can be automatically detecting using any of a variety of public and/or proprietary pattern matching or data detection techniques. Module 304 can optionally be configured with (or otherwise obtain) an indication of an expected interval with which repetitive data is expected to be transmitted in a particular type of wireless signal (or from a particular wireless source) to assist in detecting repetitive data. For example, module 304 can be configured with (or otherwise obtain) an indication that a cellular signal includes repetitive data transmitted every 100 ms, an FM radio signal includes repetitive data transmitted every 1 second, and so forth.

In other embodiments, beacon detection module 304 is configured with or otherwise obtains an indication of the repetitive data for one or more wireless sources. This indication can be obtained, for example, from another module or component of device 300, from another device, and so forth.

The repetitive data can be any of a variety of different data, and can vary based on the particular type of wireless signal and/or the particular wireless source. For example, the repetitive data can be an identifier of a particular wireless source, such as an identifier of a particular wireless access point and/or particular wireless network, an identifier of a particular cell transceiver, an identifier of a particular television, AM radio, or FM radio transmitter, and so forth. A wireless source can transmit the repetitive data included in a same channel and/or at a same frequency as other data transmitted by the wireless source, or alternatively can transmit the repetitive data on a separate (e.g., dedicated) channel and/or frequency (e.g., on a synchronization channel).

In situations in which device 300 is moved to a new position, offset determination module 318 evaluates the timing of receipt of the repetitive data at a trusted position relative to the timing of receipt of the repetitive data at the new position to determine a distance away from the wireless source the new position is relative to the trusted position. This distance away from the wireless source, optionally along with a direction of movement as determined based on inertial data from inertial sensor module 308, is used to identify the new position of device 300. The signals detected by module 304 at the new position at a particular time (and optionally various characteristics of the signals), as well as the identification of the new position, are recorded as observation data in observation buffer 320. The signals detected by module 304 that are recorded as at least part of the observation data can be received from the same wireless source as the repetitive data, and/or one or more other wireless sources (different than the wireless source from which the repetitive data is received).

It should be noted that, depending on the type of wireless signal, the repetitive data can be detected by the device in different manners. For example, the repetitive data can be included in a wireless signal (e.g., a Wi-Fi or cellular signal) transmitted at a frequency that is not audible to the human ear, but nonetheless can be received by a receiver of device 300. Alternatively, the repetitive data can be included in a wireless signal (e.g., an FM radio signal) that is audible (or near-audible) to the human ear, and a microphone or other receiver sensing sounds audible (or near-audible) to the human ear can receive and detect the repetitive data.

Figure 4:
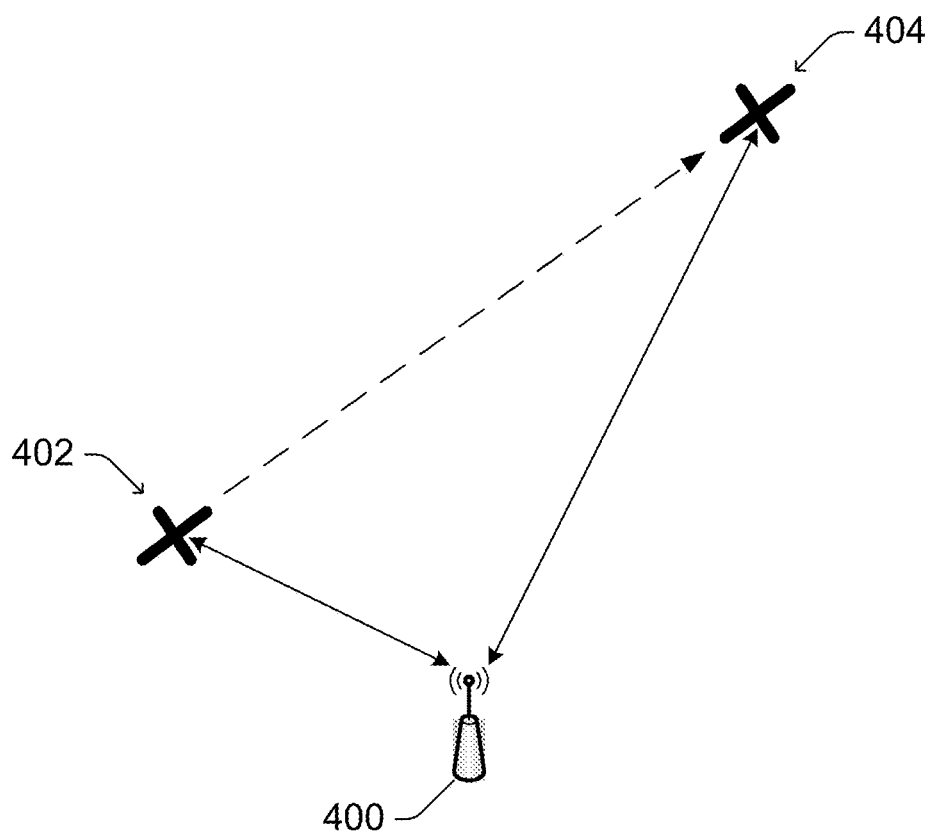
FIG. 4 illustrates an example of using repetitive data to identify device positions in accordance with one or more embodiments.

FIG. 4 illustrates an example of using repetitive data to identify device positions in accordance with one or more embodiments. FIG. 4 illustrates an example wireless source 400 transmitting repetitive data. In the example of FIG. 4, assume a device (e.g., device 300 of FIG. 3) is at a position 402 and detects the repetitive data from wireless source 400. Position 402 is a trusted position, identified by the device in various manners as discussed above. The device (e.g., beacon detection module 304 and/or offset determination module 318 of device 300 of FIG. 3) detects a timing of receipt of the repetitive data at position 402. The timing of receipt of the repetitive data refers to the interval at which the repetitive data is received, as well as a timing (relative to a clock of the device) at which the repetitive data is received. For example, the timing of receipt of the repetitive data may be every 1 second on the second exactly (e.g., using a format of MM:SS:mmm:sss:nnn (where "MM" refers to minutes, "SS" refers to seconds, "mmm" refers to milliseconds, "sss" refers to microseconds, and "nnn" refers to nanoseconds) at device clock times of 30:01:390:640:738, 30:02:390:640:738, 30:03:390:640:738, and so forth). By way of another example, the timing of receipt of the repetitive data may be every 70 nanoseconds (ns) on some particular nanosecond boundary (e.g., at device clock times, using a format of MM:SS:mmm:sss:nnn, of 27:34:160:340:100, 27:34:160:340:170, 27:34:160:340:240, 27:34:160:340:310, and so forth).

Further assume that the device is moved from position 402 to a position 404. The direction of movement of the device can be determined using various inertial data sensors as discussed above. For example, a compass in the device can be used to determine the direction of movement from position 402 to position 404. The device (e.g., beacon detection module 304 and/or offset determination module 318 of FIG. 3) detects a timing of receipt of the repetitive data at position 404.

The distance that position 404 is away from wireless source 400 relative to position 402 can be readily determined based on the timing of receipt of the repetitive data at position 402 relative to the timing of receipt of the repetitive data at position 404, and the speed at which the wireless signals travel. It should be noted that this distance is the distance that position 404 is away from wireless source 400 relative to position 402 (e.g., position 404 is a particular number of meters closer to or further away from wireless source 400 than position 402) rather than a specific distance that position 404 is away from wireless source 400.

The distance that position 404 is away from wireless source 400 relative to position 402 can be readily identified by, for example, multiplying the speed at which the wireless signals transmitted by wireless source 400 propagate or travel by the difference between the timing of receipt of the repetitive data at position 402 and the timing of receipt of the repetitive data at position 404. The difference between the timing of receipt of the repetitive data at position 402 and the timing of receipt of the repetitive data at position 404 is the difference between when the repetitive data is expected to be received (based on the timing of receipt of the repetitive data at position 402) and when the repetitive data is actually received. For example, if the timing of receipt of the repetitive data at position 402 is every 1 second on the second exactly, (e.g., using a format of MM:SS:mmm:sss:nnn, at device clock times of 30:01:390:640:738, 30:02:390:640:738, 30:03:390:640:738, and so forth), but the repetitive data is offset form being on the second exactly by 200 ms (e.g., using a format of MM:SS:mmm:sss:nnn, at device clock times of 30:01:590:640:738, 30:02:590:640:738, 30:03:590:640:738, and so forth), then the difference between the timing of receipt of the repetitive data at position 402 and the timing of receipt of the repetitive data at position 404 is 200 ms.

The direction of movement of the device, and a distance that position 404 is away from wireless source 400 relative to position 402, can serve as a basis for determining an identification of position 404 (using latitude and longitude or other coordinate system as discussed above). This direction of movement and distance can be used in conjunction with additional information, such as a direction of wireless source 400 relative to positions 402 and 404 (e.g., the direction from which wireless signals are received), the location of wireless source 400, and so forth, to readily determine an identification of position 400.

With the identification of position 404 being determined, position 404 can be treated as a trusted position. The signals detected by the device at position 404 (and optionally various characteristics of the signals) at a particular time, as well as the identification of the new position, are recorded as observation data in an observation buffer (e.g., observation buffer 320 of FIG. 3) as discussed above.

Figure 5:
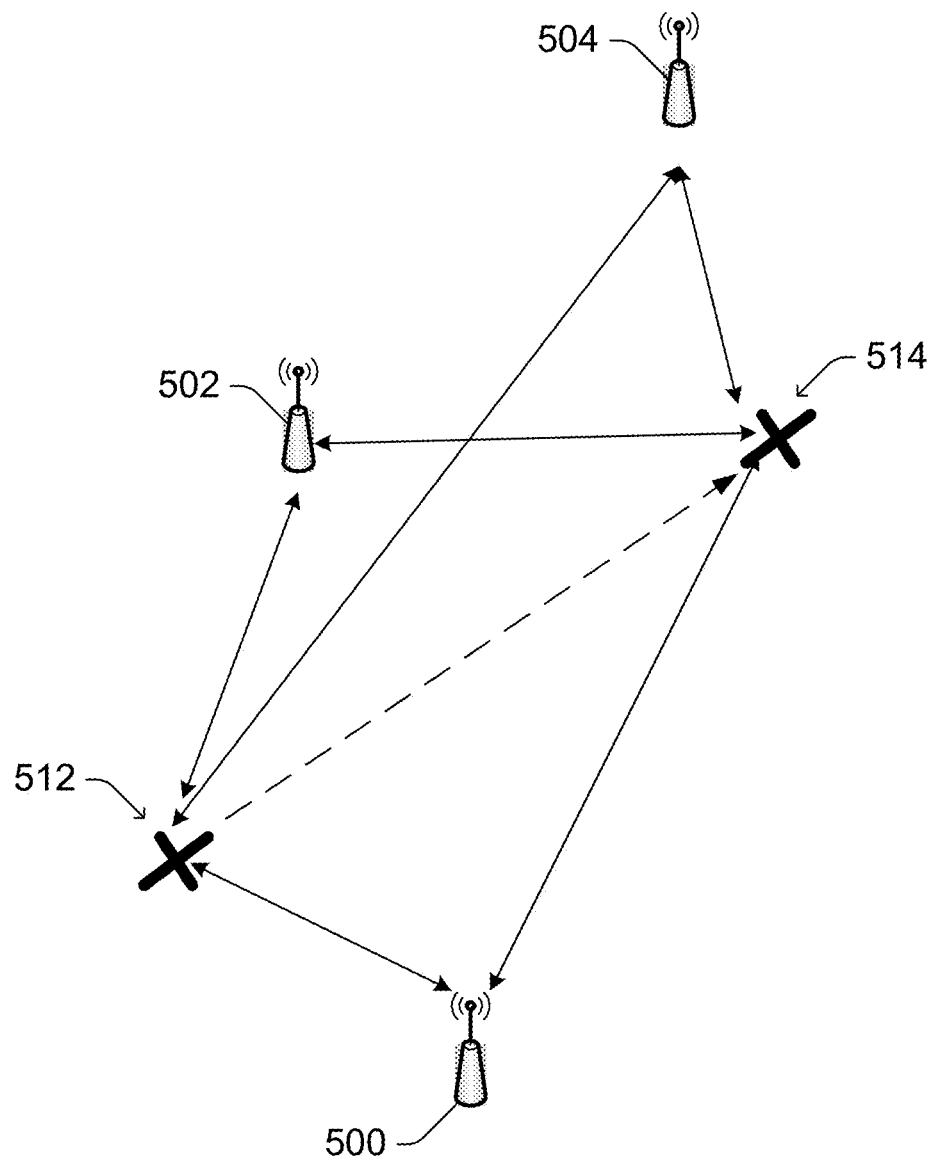
FIG. 5 illustrates another example of using repetitive data to identify device positions in accordance with one or more embodiments.

FIG. 5 illustrates another example of using repetitive data to identify device positions in accordance with one or more embodiments. FIG. 5 illustrates an example wireless source 500 transmitting repetitive data, an example wireless source 502 transmitting repetitive data, and an example wireless source 504 transmitting repetitive data. Wireless sources 500, 502, and 504 can be transmitting the same and/or different types of wireless signals. For example, wireless sources 500, 502, and 504 can all be transmitting Wi-Fi signals. By way of another example, wireless sources 500 and 502 can be transmitting Wi-Fi signals, and wireless source 504 can be transmitting cellular signals. By way of yet another example, wireless source 500 can be transmitting Wi-Fi signals, wireless source 502 can be transmitting cellular signals, and wireless source 504 can be transmitting FM radio signals.

In the example of FIG. 5, assume a device (e.g., device 300 of FIG. 3) is at a position 512 and detects the repetitive data from wireless sources 500, 502, and 504. Position 512 is a trusted position, identified by the device in various manners as discussed above. The device (e.g., beacon detection module 304 and/or offset determination module 318 of device 300 of FIG. 3) detects a timing of receipt of the repetitive data from each of wireless sources 500, 502, and 504 at position 512. The timing of receipt of the repetitive data refers to the interval at which the repetitive data is received, as well as a timing (relative to a clock of the device) at which the repetitive data is received, as discussed above.

Further assume that the device moves from position 512 to position 514. Given the timing of receipt of the repetitive data from each of wireless sources 500, 502, and 504 at position 514, an identification of position 514 can be readily determined (using latitude and longitude or other coordinate system as discussed above) using any of a variety of public and/or proprietary techniques.

With the identification of position 514 being determined, position 514 can be treated as a trusted position. The signals detected by the device at position 514 (and optionally various characteristics of the signals) at a particular time, as well as the identification of the new position, are recorded as observation data in an observation buffer (e.g., observation buffer 320 of FIG. 3) as discussed above.

Additionally, if repetitive data is received from only two wireless sources (e.g., wireless sources 500 and 502), then with additional information (such as direction of movement from a gyroscope or compass, distance of movement from an accelerometer, etc.), an identification of position 514 can be readily determined (using latitude and longitude or other coordinate system as discussed above) using any of a variety of public and/or proprietary techniques.

It should also be noted that the repetitive data can be used in conjunction with GNSS functionality. The signals received from one or more satellites can be used together with the timing of receipt of the repetitive data from other wireless sources to identify position 514. For example, a GNSS satellite can be viewed as one of the wireless sources 500, 502, or 504. The timing of signals received from the various wireless sources, including one or more GNSS satellites, can be used with any of a variety of public and/or proprietary techniques to identify position 514.

Returning to FIG. 3, offset determination module 318 can also record the timing of repetitive data relative to a reference time, which refers to a clock or time known to the various devices (e.g., devices 102 of FIG. 1) and optionally crowd sourcing data service (e.g., crowd sourcing data service 104 of FIG. 1). The timing of repetitive data relative to the reference time can be stored as part of the observation data in observation buffer 320. For example, at a particular location, in addition to the signals detected by beacon detection module 304 at that particular location, offset determination module 318 can determine the timing of receipt of the repetitive signal, such as the signal is received every 100 ms on the 100-millisecond mark (e.g., using a format of MM:SS:mmm:sss:nnn, at device clock times of 24:36:600:729:038, 24:36:700:729:038, 24:36:700:729:038, and so forth), every 20 ns on the 10-nanosecond mark (e.g., using a format of MM:SS:mmm:sss:nnn, at device clock times of 17:29:352:472:010, 17:29:352:472:030, 17:29:352:472:050, and so forth), etc. This timing of repetitive data can be used analogous to the use of other identifiers of wireless signals (and optionally various characteristics of those wireless signals) to determine the location of a device as discussed above.

Backtracking module 316 determines a position of device 300 at a particular point in time based on backtracking after a trusted position of device 300 is identified. The trusted position of device 300 can be identified in various manners as discussed above, such as a position identified by GNSS module 302, a position identified by a wireless signal received from a wireless transmitter, a position determined by offset determination module 318, and so forth. Backtracking module 316 can be used to determine a position of device 300 at various times, such as situations in which GNSS module 302 (or a position identified in a signal received by beacon detection module 304) is not available or used.

When using backtracking, data management module 314 receives and records the data collected by inertial sensor module 308 in observation buffer 320 (or alternatively another buffer or data store). Wireless signals detected by beacon detection module 304 (and optionally various characteristics of the signals) are also recorded in observation buffer 320, but are not yet associated with a particular trusted position. In one or more embodiments, the wireless signals detected by module 304 are recorded as associated with a particular time, such as a timestamp of when the wireless signals were detected by module 304 or received by data management module 314, inherently based on a particular time interval or other event causing wireless signals to be recorded (e.g., situations in which detected wireless signals are recorded every ten seconds or other threshold amount of time), and so forth. In other embodiments, the wireless signals detected by module 304 are recorded associated with particular inertial data received from inertial sensor module 308. For example, in response to a particular event (e.g., a threshold amount of time elapsing since the last inertial data was recorded, a threshold distance moved since the last inertial data was recorded, a change in direction of movement, etc.), inertial data can be recorded indicating a direction and distance of movement since the last inertial data was recorded. Each time this inertial data is recorded, an indication of the wireless signals detected at the time of recording of the inertial data can also be stored.

It should be noted that inertial data is detected and recorded without any knowledge of a position of device 300 when the recording of the inertial data begins. No starting or previous trusted position need have been identified for device 300, and no starting or previous trusted position is relied upon by backtracking module 316. Rather, backtracking module 316 determines trusted positions for device 300 based on a trusted position identified after the inertial data is recorded as discussed below.

When a trusted position of device 300 is identified after inertial data is stored in observation buffer 320, backtracking module 316 performs backtracking by analyzing the inertial sensor data starting at the trusted position. Module 316 works backwards through the inertial sensor data collected by inertial sensor module 308 and recorded in observation buffer 320 that leads up to the trusted position, performing dead reckoning positioning using the inertial sensor data recorded in observation buffer 320 (starting at the trusted position, so the data is provided in the opposite order in which it was collected by inertial sensor module 308). The dead reckoning positioning analyzes the data collected from the inertial sensors using a variety of different conventional and/or proprietary algorithms, rules, or criteria to identify, based on a known starting position (the trusted position) and movement of device 300, the position of device 300 at a particular time. Module 316 thus effectively treats device 300 as moving backwards based on the stored inertial sensor data.

Given the positions of device 300 at particular times as identified by the dead reckoning positioning, observation data including the identified positions of device 300 is stored in observation buffer 320 as well as data identifying wireless signals detected (and optionally various characteristics of the signals) by beacon detection module 304 at those particular times (previously stored in observation buffer 320 as discussed above). The associated particular times can also be stored as part of the observation data, and the positions of device 300 identified by the dead reckoning positioning are also treated as trusted positions. The observation data including these trusted positions identified using dead reckoning positions are provided to a crowd sourcing data service as discussed above.

In one or more embodiments, inertial sensor module 308 provides data to data management module 314 for a threshold amount of time. This threshold amount of time can be a fixed amount of time, such as a particular number of minutes (e.g., one minute or ten minutes). This threshold amount of time can also be a relative amount of time, such as an amount of time dependent on an amount of battery life remaining in a battery of device 300 (e.g., a longer amount of time if there is greater than a threshold amount of battery life remaining, and a smaller amount of time if there is less than the threshold amount of battery life remaining), an accuracy of the inertial sensors (e.g., a longer amount of time for inertial sensors that are more accurate than for sensors that are less accurate), and so forth. If a trusted position is not identified within the threshold amount of time, then the inertial sensor module 308 is powered down. Powering down inertial sensor module 308 powers down the inertial sensors of module 308, thereby reducing the power consumed by the inertial sensors of device 300.

Thus, for example, a user of device 300 can power on his or her device within a tunnel, building, or other location where a trusted position cannot be obtained. Inertial data, however, and detected wireless signals can still be recorded, and the detected wireless signals associated with particular positions after a trusted position is identified (e.g., by GNSS module 302 or a position identified in a signal received by beacon detection module 304).

Figure 6:
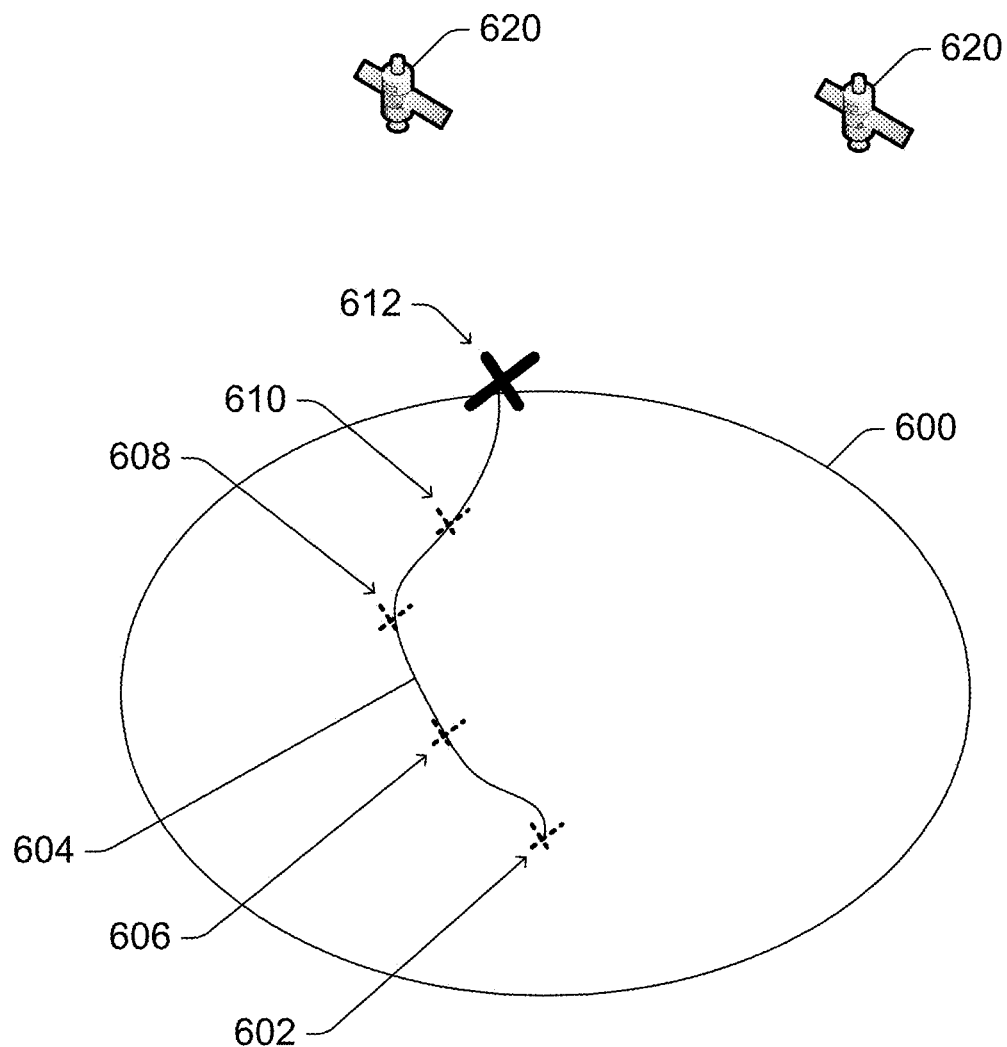
FIG. 6 illustrates an example use of backtracking in accordance with one or more embodiments.

FIG. 6 illustrates an example use of backtracking in accordance with one or more embodiments. A region 600 is illustrated in FIG. 6 in which no signal is received (e.g., satellite signals detected by a GNSS module, Wi-Fi or other wireless signals identifying a position, etc.) providing a trusted position to a device. A device begins, at a position 602, recording inertial sensor data (e.g., distance and direction moved) and records wireless signals detected (and optionally various characteristics of the signals) by the device at position 602. The device moves through region 600 along path 604, with additional inertial sensor data being recorded and wireless signals detected (and optionally various characteristics of the signals) at each of positions 606, 608, and 610 along path 604. When the device begins collecting the inertial sensor data at position 602, the device has no previous trusted position from which it can work to identify trusted positions along path 604. Positions 602, 606, 608, and 610 are thus also initially referred to as unknown positions.

At a position 612, a trusted position of the device can be identified by a GNSS module of the device based on signals received from one or more satellites 620. The backtracking module uses dead reckoning to identify, based on trusted position 612, the positions 610, 608, 606, and 602 (e.g., identify coordinates of the positions 610, 608, 606, and 602). The backtracking module thus converts positions 602, 606, 608, and 610 from unknown positions to trusted positions without having any indication of a trusted position when recording of the inertial data began. Observation data identifying these trusted positions 602, 606, 608, and 610, and signals detected by the device (and optionally various characteristics of the signals) at each of positions 602, 606, 608, and 610, is recorded and provided to a crowd sourcing data service as discussed above.

Returning to FIG. 3, in one or more embodiments backtracking module 316 can leverage the timing of receipt of repetitive data from one or more wireless sources to compensate for drift in the inertial data. Inertial data is obtained from one or more inertial sensors that detect movement (e.g., rotation, motion, velocity, etc.), position, and/or direction as discussed above. However, inertial sensors can suffer from drift, which is error that accumulates over time and/or movement. The timing of repetitive data can be stored as part of the observation data, the timing being relative to a previous position where observation data was recorded or relative to a reference time. In situations in which there are insufficient wireless sources providing repetitive data to identify an accurate position of the device, the timing of repetitive data from multiple different wireless sources can still be analyzed using any of a variety of public and/or proprietary techniques to identify multiple potential positions. The one of the multiple potential positions that is closest to the position (e.g., the closest linear distance to the position) determined using backtracking is identified as the trusted position. Thus, the timing of repetitive data can be used to compensate for some drift of the inertial sensors.

Figure 7:
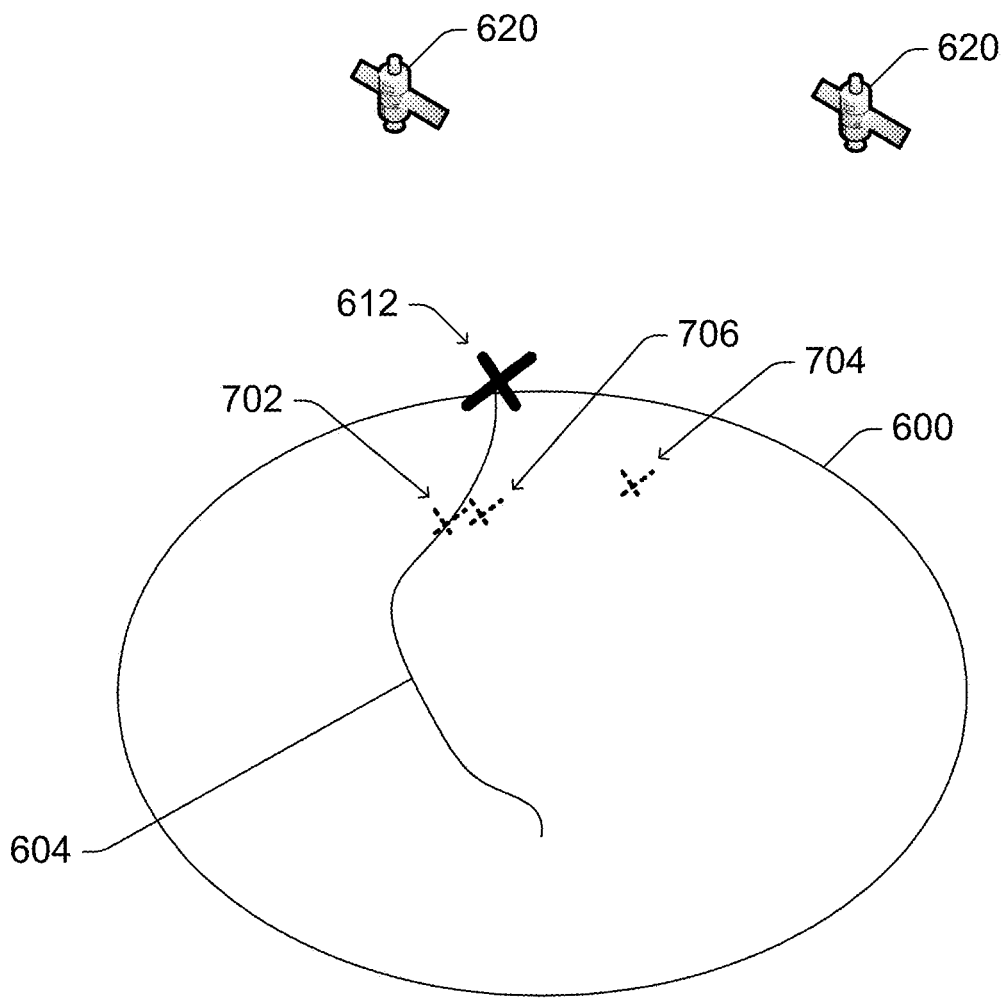
FIG. 7 illustrates an example use of backtracking leveraging the timing of receipt of repetitive data from one or more wireless sources in accordance with one or more embodiments.

FIG. 7 illustrates an example use of backtracking leveraging the timing of receipt of repetitive data from one or more wireless sources in accordance with one or more embodiments. A region 600, path 604, trusted position 612, and one or more satellites 620 are illustrated, as discussed above with reference to FIG. 6. When backtracking from trusted position 612, the offset determination module determines, based on the timing of repetitive data from multiple different wireless sources, multiple potential positions 702 and 704. Multiple potential positions are determined because, for example there are insufficient wireless sources providing repetitive data to identify which of positions 702 and 704 is an accurate position.

However, the backtracking module uses dead reckoning to identify, based on trusted position 612, the position 706, which is close to path 604 but not exactly on path 604 due to drift of the inertial sensors. The backtracking module selects the one of the multiple potential positions 702 and 704 that is closest to the position 706 as the trusted position along path 604 determined using backtracking. Thus, although some inertial sensor drift was experienced, the inertial sensor drift was compensated for by leveraging the timing of receipt of repetitive data from one or more wireless sources.

Returning to FIG. 3, position determination module 306 obtains a current position of device 300 in response to a request (e.g., from another module of device 300, from an application or program running on device 300, and so forth). Position determination module 306 can obtain the current position of device 300 in various manners. In one or more embodiments, position determination module 306 requests a current position of device 300 from crowd sourcing module 310. Data management module 314 checks observation buffer 320 to determine whether buffer 320 includes a record of an observation having a timestamp within a threshold amount of time (e.g., five seconds) of the current time (e.g., the time the request is received). If such a record is present in observation buffer 320, then the trusted position included in the observation data of that record is returned to position determination module 306 and used as the position of device 300. Observation buffer 320 can thus operate as a local cache, allowing the position of device 300 to be provided in certain situations without accessing GNSS module 302 and/or beacon detection module 304.

If the current position of device 300 is not available from observation buffer 320, then position determination module 306 can invoke beacon detection module 304 to detect one or more wireless signals. Position determination module 306 communicates the detected one or more wireless signals to a crowd sourcing data service (e.g., crowd sourcing data service 104 of FIG. 1), and receives a position of device 300 based on the detected one or more wireless signals. This received position is used as the position of device 300.

Alternatively, if the current position of device 300 is not available from observation buffer 320, then position determination module 306 can invoke GNSS module 302 to obtain a position of device 300. In response, GNSS module 302 determines a position of device 300 based on one or more satellites from which GNSS module 302 can receive signals or otherwise communicate, and this position is used as the position of device 300. In determining a position of device 300, GNSS module 302 can leverage crowd sourcing module 310. GNSS module 302 can obtain an indication of the most recent position of device 300 as identified in observation buffer 320 (e.g., the trusted position included in the record of observation data having the most recent timestamp). GNSS module 302 can request the indication of the most recent position of device 300 (e.g., from data management module 314) or be provided the indication by position determination module 306 (e.g., which obtained the indication from data management module 314).

The manner in which GNSS module 302 uses the indication of the most recent position of device 300 can vary based on the manner in which GNSS module 302 is implemented. Generally, the indication of the most recent position of device 300 provides GNSS module 302 with an indication of an approximate or general position of device 300 (e.g., typically within a couple hundred kilometers). GNSS module 302 can proceed with attempting to identify one or more satellites from which a signal can be received based on the approximate or general position of device 300. For example, GNSS module 302 can begin with attempting to identify one or more satellites from which a signal can be received based on satellites from which module 302 is expected (e.g., based on a table or mapping included in or accessible to module 302) to be able to receive a signal in light of the approximate position of device 300. This can reduce the amount of time taken by GNSS module 302 to identify the position of device 300 because module 302 is beginning with attempting to identify one or more satellites from which a signal can be received with satellites from which module 302 is likely to receive a signal. Thus, even if observation buffer 320 does not include observation data with a trusted position that can itself be used as the position of device 300, the trusted position from observation buffer 320 can be used by GNSS module 302 to reduce the amount of time taken to identify the position of device 300.

Figure 8:
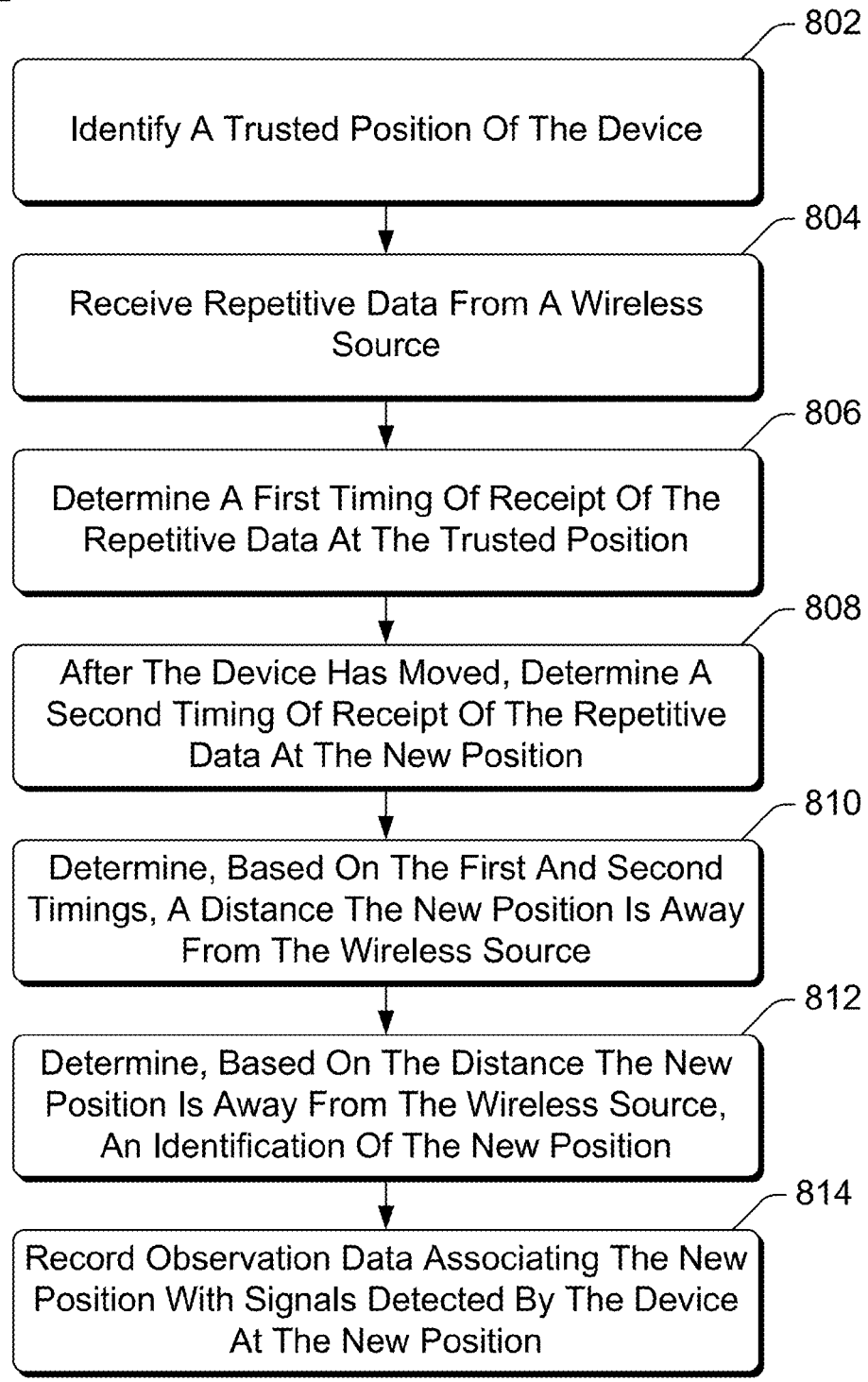
FIG. 8 is a flowchart illustrating an example process for implementing the crowd sourcing with robust device position determination in accordance with one or more embodiments.

FIG. 8 is a flowchart illustrating an example process 800 for implementing the crowd sourcing with robust device position determination in accordance with one or more embodiments. Process 800 is carried out by a device, such as device 102 of FIG. 1 or device 300 of FIG. 3, and can be implemented in software, firmware, hardware, or combinations thereof. Process 800 is shown as a set of acts and is not limited to the order shown for performing the operations of the various acts. Process 800 is an example process for implementing the crowd sourcing with robust device position determination; additional discussions of implementing the crowd sourcing with robust device position determination are included herein with reference to different figures.

In process 800, a trusted position of the device implementing process 300 is identified (act 802). This trusted position can be identified in various different manners as discussed above.

Repetitive data is received from a wireless source (act 804). This repetitive data can be received at various intervals, and can be detected in various manners as discussed above.

A first timing of receipt of the repetitive data is determined (act 806). The first timing of receipt of the repetitive data is the timing of receipt of the repetitive data at the trusted position identified in act 802.

The device is then moved from the trusted position to a new position, and after being moved a second timing of receipt of the repetitive data is determined (act 808). The second timing of receipt of the repetitive data is the timing of receipt of the repetitive data at the new position to which the device is moved.

A determination is made, based on the first and second timings, of a distance from the wireless source that the new position is relative to the trusted position (act 810). This determination can be readily made based on the first timing determined in act 806 and the second timing determined in act 808, as discussed above.

Based on the distance away from the wireless source that the new position is relative to the trusted position, an identification of the new position is determined (act 812). This identification of the new position is, for example, coordinates of the new position in any of a variety of coordinate systems as discussed above (e.g., a same coordinate system as identifies the trusted position in act 802).

Observation data associating the new position with signals detected by the device (and optionally various characteristics of the signals) at the new position is recorded (act 814). This observation data can subsequently be provided to a crowd sourcing data service as discussed above.

FIG. 9 is a flowchart illustrating another example process 900 for implementing the crowd sourcing with robust device position determination in accordance with one or more embodiments. Process 900 is carried out by a device, such as device 102 of FIG. 1 or device 300 of FIG. 3, and can be implemented in software, firmware, hardware, or combinations thereof. Process 900 is shown as a set of acts and is not limited to the order shown for performing the operations of the various acts. Process 900 is an example process for implementing the crowd sourcing with robust device position determination; additional discussions of implementing the crowd sourcing with robust device position determination are included herein with reference to different figures.

In process 900, both inertial data identifying movement of the device and signals (and optionally various characteristics of the signals) detected by the device are recorded for an amount of time (act 902). The recording is performed without knowing a trusted position of the device, as discussed above. The amount of time can be various different threshold amounts of time, as discussed above.

After beginning recording of the inertial data and signals detected by the device, a trusted position of the device is identified (act 904). This trusted position can be identified in various different manners as discussed above.

Based on the identified trusted position of the device and the recorded inertial data, particular positions of the device associated with particular signals (and optionally various characteristics of the signals) detected by the device are determined (act 906). These positions are determined using backtracking as discussed above, and once determined are treated as trusted positions as discussed above. These trusted positions and associated signals (and optionally various characteristics of the signals) detected by the device are recorded as observation data, and can subsequently be provided to a crowd sourcing data service as discussed above.

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
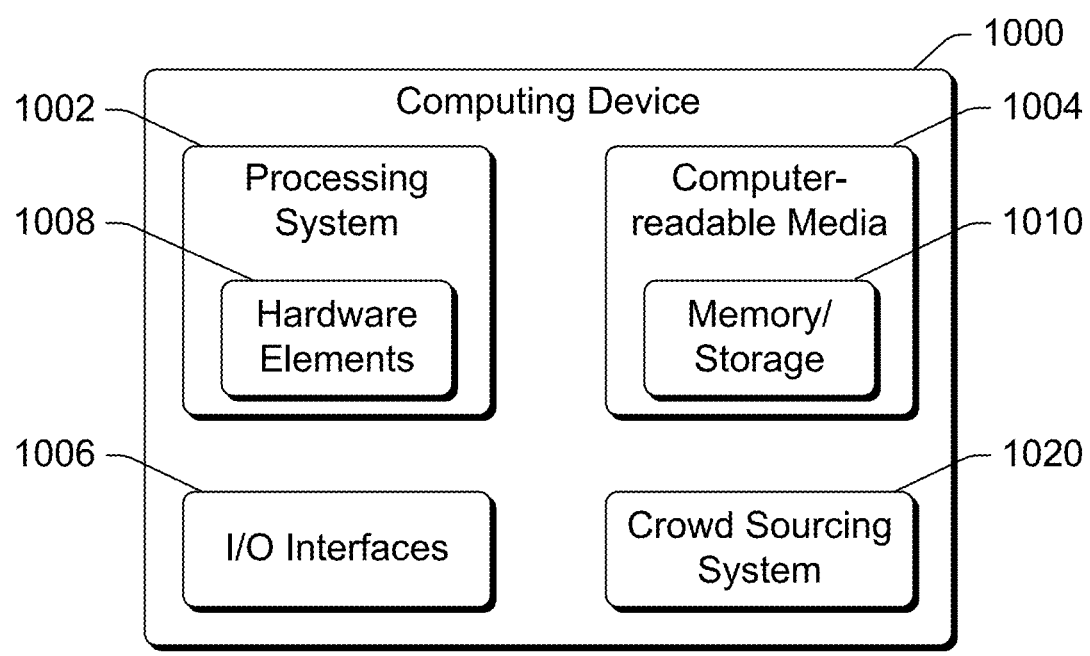
FIG. 10 illustrates an example computing device that can be configured to implement the crowd sourcing with robust device position determination in accordance with one or more embodiments.

FIG. 10 illustrates an example computing device 1000 that can be configured to implement the crowd sourcing with robust device position determination in accordance with one or more embodiments. Computing device 1000 can, for example, be a device 102 of FIG. 1, implement at least part of crowd sourcing data service 104 of FIG. 1, or be a device 300 of FIG. 3, and so forth.

Computing device 1000 as illustrated includes a processing system 1002, one or more computer-readable media 1004, and one or more I/O Interfaces 1006 that are communicatively coupled to one another. Although not shown, computing device 1000 can further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1002 is representative of functionality to perform one or more operations using hardware. Accordingly, processing system 1002 is illustrated as including hardware elements 1008 that can be configured as processors, functional blocks, and so forth. This can include implementation in hardware as an application specific integrated circuit or other logic device formed using one or more semiconductors. Hardware elements 1008 are not limited by the materials from which they are formed or the processing mechanisms employed therein. For example, processors can be comprised of semiconductor(s) and/or transistors (e.g., electronic integrated circuits (ICs)). In such a context, processor-executable instructions can be electronically-executable instructions.

Computer-readable media 1004 is illustrated as including memory/storage 1010. Memory/storage 1010 represents memory/storage capacity associated with one or more computer-readable media. Memory/storage 1010 can include volatile media (such as random access memory (RAM)) and/or nonvolatile media (such as read only memory (ROM), Flash memory, optical disks, magnetic disks, and so forth). Memory/storage 1010 can include fixed media (e.g., RAM, ROM, a fixed hard drive, and so on) as well as removable media (e.g., Flash memory, a removable hard drive, an optical disc, and so forth). Computer-readable media 1004 can be configured in a variety of other ways as further described below.

Input/output interface(s) 1006 are representative of functionality to allow a user to enter commands and information to computing device 1000, and also allow information to be presented to the user and/or other components or devices using various input/output devices. Examples of input devices include a keyboard, a cursor control device (e.g., a mouse), a microphone (e.g., for voice or other audible inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, a tactile-response device, and so forth. Thus, computing device 1000 can be configured in a variety of ways to support user interaction.

Computing device 1000 also includes a crowd sourcing system 1020. Crowd sourcing system 1020 provides various crowd sourcing functionality as discussed above. Crowd sourcing system 1020 can, for example, be crowd sourcing module 108 of FIG. 1, be crowd sourcing module 310 of FIG. 3, or implement at least part of crowd sourcing data service 104 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques can be implemented on a variety of commercial computing platforms having a variety of processors.

An implementation of the described modules and techniques can be stored on or transmitted across some form of computer-readable media. The computer-readable media can include a variety of media that can be accessed by the computing device 1000. By way of example, and not limitation, computer-readable media can include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1000, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1008 and computer-readable media 1004 are representative of instructions, modules, programmable device logic and/or fixed device logic implemented in a hardware form that can be employed in some embodiments to implement at least some aspects of the techniques described herein. Hardware elements 1008 can include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing can also be employed to implement various techniques and modules described herein. Accordingly, software, hardware, or program modules and other program modules can be implemented as one or more instructions and/or logic embodied on some form of computer-readable storage media and/or by one or more hardware elements 1008. Computing device 1000 can be configured to implement particular instructions and/or functions corresponding to the software and/or hardware modules. Accordingly, implementation of a module that is executable by the computing device 1000 as software can be achieved at least partially in hardware, e.g., through use of computer-readable storage media and/or hardware elements 1008 of the processing system. The instructions and/or functions can be executable/operable by one or more articles of manufacture (for example, one or more computing devices 1000 and/or processing systems 1002) to implement techniques, modules, and examples described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
   identifying a trusted position of the device;
   receiving repetitive data from a wireless source;
   determining a first timing of receipt of the repetitive data at the trusted position;
   determining, after the device has moved from the trusted position to a new position, a second timing of receipt of the repetitive data at the new position;
   determining, based on both the first timing and the second timing, a distance away from the wireless source that the new position is relative to the trusted position;
   determining, based on the distance away from the wireless source that the new position is relative to the trusted position, an identification of the new position; and
   recording observation data associating the new position with signals detected by the device at the new position.

2. A method as recited in claim 1, further comprising:
   recording, at the device prior to knowing the trusted position of the device, for an amount of time both inertial data identifying movement of the device and signals detected by the device;
   the identifying comprising identifying, after beginning recording of the inertial data and signals detected by the device, the trusted position of the device; and
   determining, based on the identified trusted position of the device and the recorded inertial data, particular positions of the device associated with particular signals detected by the device.

3. A method as recited in claim 1, the identification of the new position comprising coordinates of the new position in a same coordinate system as an identification of the trusted position.

4. A method as recited in claim 1, further comprising:
   obtaining inertial sensor data of the device, the inertial sensor data indicating a direction of movement from the trusted position towards the new position; and
   wherein the determining an identification of the new position further comprises determining, based on the direction of movement, the identification of the new position.

5. A method as recited in claim 1, further comprising automatically detecting the repetitive data.

6. A method as recited in claim 1, further comprising:
   obtaining an indication of an expected timing of the repetitive data from another device; and
   detecting the repetitive data based at least in part on the expected timing of the repetitive data.

7. A method as recited in claim 1, the wireless source comprising a cellular transceiver, and the signals detected by the device comprising wireless signals from the cellular transceiver.

8. A method as recited in claim 1, the signals detected by the device being detected from a different wireless source than the wireless source from which the repetitive data is received.

9. A method as recited in claim 1, the repetitive data comprising an identifier of the wireless source.

10. A method as recited in claim 1, further comprising providing the observation data to a crowd sourcing data service.

11. A method as recited in claim 1, the signals comprising cellular signals and/or Wi-Fi signals.

12. One or more computer-readable storage media having stored thereon multiple instructions that, when executed by one or more processors of a device, cause the one or more processors to:
   record, at the device without knowing a trusted position of the device when the recording begins, for an amount of time both inertial data identifying movement of the device and signals detected by the device;
   identify, after beginning recording of the inertial data and signals detected by the device, a trusted position of the device that is an identification of an area where the device is geographically; and
   determine, based on the identified trusted position of the device and the recorded inertial data, particular positions of the device associated with particular signals detected by the device.

13. One or more computer-readable storage media as recited in claim 12, the instructions that cause the one or more processors to record both the inertial data identifying movement of the device and signals detected by the device comprising instructions that cause the one or more processors to:
   record, at a particular time and in response to an event, inertial data indicating both a direction and distance of movement since inertial data was last recorded; and
   record signals from one or more wireless sources detected by the device at the particular time.

14. One or more computer-readable storage media as recited in claim 13, the particular event comprising a threshold amount of time elapsing since inertial data was last recorded.

15. One or more computer-readable storage media as recited in claim 12, the instructions that cause the one or more processors to record both the inertial data identifying movement of the device and signals detected by the device comprising instructions that cause the one or more processors to record both the inertial data and signals detected by the device at multiple unknown positions prior to identifying the trusted position of the device.

16. One or more computer-readable storage media as recited in claim 12, the multiple instructions further causing the one or more processors to record observation data, for each of the particular positions of the device, associating the particular position with signals detected by the device at the particular position.

17. One or more computer-readable storage media as recited in claim 16, the multiple instructions further causing the one or more processors to provide the observation data to a crowd sourcing data service.

18. One or more computer-readable storage media as recited in claim 12, the amount of time comprising a threshold number of minutes.

19. One or more computer-readable storage media as recited in claim 12, the particular signals comprising cellular signals and/or Wi-Fi signals.

20. One or more computer-readable storage media having stored thereon multiple instructions that, when executed by one or more processors of a device, cause the one or more processors to:
   identify a first position of the device, the first position being a trusted position;
   receive repetitive data from a wireless source, the repetitive data comprising an identifier of the wireless source;
   determine a first timing of receipt of the repetitive data at the first position;
   determine, after the device has moved from the first position to a second position, a second timing of receipt of the repetitive data at the second position;
   determine, based on both the first timing and the second timing, a distance away from the wireless source that the second position is relative to the first position;

determine, based on both the distance away from the wireless source that the second position is relative to the first position and a direction of movement from the first position towards the second position, an identification of the second position; and record observation data associating the second position with signals from the wireless source detected by the device at the second position.

* * * * *